United States Patent
Uistola

(10) Patent No.: US 7,050,771 B2
(45) Date of Patent: *May 23, 2006

(54) METHOD AND APPARATUS FOR INCREASING A PROBABILITY THAT A DUAL-BAND MOBILE STATION WILL ACQUIRE A DESIRED AUTONOMOUS SYSTEM

(75) Inventor: Ari Uistola, Oulu (FI)

(73) Assignee: Nokia Corporation, Espoo (FI)

( * ) Notice: Subject to any disclaimer, the term of this patent is extended or adjusted under 35 U.S.C. 154(b) by 647 days.

This patent is subject to a terminal disclaimer.

(21) Appl. No.: 09/835,885

(22) Filed: Apr. 16, 2001

(65) Prior Publication Data

US 2001/0036837 A1  Nov. 1, 2001

Related U.S. Application Data

(63) Continuation of application No. 08/990,043, filed on Dec. 12, 1997, now Pat. No. 6,229,996.

(51) Int. Cl.
*H04B 1/18* (2006.01)

(52) U.S. Cl. .............. 455/168.1; 455/434; 455/161.1

(58) Field of Classification Search ............ 455/552.1, 455/553.1, 168.1, 161.1, 150.1, 180.1, 186.1, 455/188.1, 51.3, 515, 434, 458, 161.3, 161.2, 455/514, 435.1–435.3, 455
See application file for complete search history.

(56) References Cited

U.S. PATENT DOCUMENTS

| 5,345,448 A | 9/1994 | Keskitalo ................... 370/95.3 |
| 5,410,733 A | 4/1995 | Niva et al. .................. 455/33.2 |
| 5,483,668 A | 1/1996 | Malkamaki et al. ....... 455/33.2 |
| 5,504,803 A | 4/1996 | Yamada ....................... 379/59 |
| 5,524,009 A | 6/1996 | Tuutijarvi et al. ......... 370/95.3 |
| 5,675,629 A | 10/1997 | Raffel et al. ................... 379/58 |
| 5,711,001 A | 1/1998 | Bussan et al. .............. 455/432 |
| 5,787,354 A | 7/1998 | Gray et al. ................. 455/456 |

(Continued)

FOREIGN PATENT DOCUMENTS

WO   WO 97/36452   3/1997   ...................... 7/38

OTHER PUBLICATIONS

IS-136.1, Rev. A, Post-Ballot Version, Feb. 12, 1996, Sections 6.3.19.1, 6.3.19.2.

*Primary Examiner*—Charles Appiah
*Assistant Examiner*—Naghmeh Mehrpour
(74) *Attorney, Agent, or Firm*—Harrington & Smith, LLP

(57) ABSTRACT

A method for operating a dual-band mobile station (10) includes a first step of (a) storing information in the mobile station. The stored information includes an ordered list of frequency bands (Band Order Table 24A). For example, at least one frequency band is an 800 MHz frequency band and at least one other frequency band is a 1900 MHz frequency band. The stored information further includes an identity (24B) of a band wherein an acceptable control channel was last located. A next step (b) is executed in response to a user invoking a search procedure to locate a new non-public system. This step accesses the memory to determine the identity of the band wherein an acceptable control channel was last located, and marks this band as a band to be searched. A next step (c) collects signal strength measurements on channels in the band to be searched and executes a channel search procedure to locate a control channel of a desired non-public system within the band to be searched. If a desired non-public system is not located in the band to be searched, a next step (d) accesses the memory to obtain a next band to be searched from the Band Order Table. The method repeats steps (c) and (d) until either the ordered list of frequency bands is exhausted or a desired non-public system is located, thereby enabling a non-public system to be located in a band other than the current band of the mobile station.

24 Claims, 3 Drawing Sheets

U.S. PATENT DOCUMENTS

| | | | |
|---|---|---|---|
| 5,818,824 A | 10/1998 | Lu et al. ..................... 370/328 |
| 5,822,686 A | 10/1998 | Lundberg et al. ........ 455/161.3 |
| 5,825,757 A * | 10/1998 | Tat et al. ..................... 370/330 |
| 5,845,198 A | 12/1998 | Bamburak et al. ......... 455/31.1 |
| 5,857,153 A | 1/1999 | Lupien ....................... 455/422 |
| 5,878,339 A | 3/1999 | Zicker et al. ............... 455/419 |
| 6,011,960 A * | 1/2000 | Yamada et al. ............... 455/77 |
| 6,026,300 A * | 2/2000 | Hicks ......................... 455/434 |
| 6,108,541 A * | 8/2000 | Yazaki et al. ............... 455/434 |
| 6,229,996 B1 * | 5/2001 | Uistola ..................... 455/168.1 |
| 6,748,214 B1 * | 6/2004 | Wallstedt et al. ........... 455/434 |
| 2002/0098848 A1 * | 7/2002 | Bamburak et al. .......... 455/455 |

* cited by examiner

METHOD AND APPARATUS FOR INCREASING A PROBABILITY THAT A DUAL-BAND MOBILE STATION WILL ACQUIRE A DESIRED AUTONOMOUS SYSTEM

This patent application is a continuation of U.S. patent application Ser. No. 08/990,043, filed Dec. 12, 1997 now U.S. Pat. No. 6,229,996.

FIELD OF THE INVENTION

This invention relates generally to radiotelephones and, in particular, to radiotelephones or mobile stations such as those capable of operation with a public system and with an autonomous system, such as a Private or Residential network.

BACKGROUND OF THE INVENTION

In modern mobile telecommunications systems a mobile station may have a choice as to whether to operate with a public cellular system or with an autonomous system, such as a Residential system or a Private system. Typically it will be desirable to operate with a selected autonomous system, which may provide a more favorable rate structure than the public cellular system(s), or that may provide a desired service not offered by the public cellular system(s). A particular autonomous system may be a Residential system that serves the user's home, or a Private system that serves the user's workplace.

One such modern cellular system is referred to as IS-136, which is described in IS-136.1, Rev. A, February 1996, and subsequent updated releases. This system employs Digital Control Channels (DCCHs) that enable a mobile station to gain access to the system. When a mobile station scans for and subsequently monitors a DCCH, it is said to be "camped" on that particular DCCH. Page messages and other information are received from the DCCH.

In Section 6.3.19 of IS-136.1 there is described a non-public mode search procedure that is to be implemented by IS-136 compliant mobile stations. As defined, while camping on a DCCH a mobile station user may decide to initiate a Non-Public Mode Search Condition in order to search for service with an alternate system (System Identification (SID), Private System Identification (PSID), or Residential System Identification (RSID)) on the current DCCH and/or other DCCHs. Two possible procedures are defined for Non-Public Mode Search: New PSID/RSID Search and Manual System Search.

Discussing first the New PSID/RSID Search procedure, when the user invokes this procedure the mobile station proceeds as follows. First the mobile station collects one signal strength measurement on each frequency in the current frequency band. The band can be one of the following: 800 MHz A or B, or 1900 MHz A, B, C, D, E, or F. Next, the mobile station makes a list of up to 24 channels with the strongest signals, and then tunes to the strongest channel in the list. The mobile station then determines if this channel contains a DCCH. If the channel contains a DCCH, the mobile station reads the Fast Broadcast Control Channel (F-BCCH) and determines therefrom if the DCCH is marked with a non-public Network Type (Private and/or Residential) that is enabled in the mobile station. If this is the case, the mobile station marks the DCCH as DCCH_1. If the channel does not contain a DCCH, or if the DCCH is not marked with a non-public Network Type that is enabled in the mobile station, then a determination is made if this is the last channel in the channel list. If it is, the procedure ends, otherwise the mobile station reads the next strongest channel in the channel list and the process repeats.

After possibly performing a Test Registration procedure, and marking an appropriate PSID/RSID as SYS_1, the mobile station displays an indication of SYS_1 to the user. If the user selects SYS_1, and after other processing, a determination is made if DCCH_1 is the current DCCH. If it is not, the mobile station adds DCCH_1 to a list of channels identified as requiring measurements (see Section 6.3.3.1, Control Channel Locking). The mobile station then, after an appropriate delay required for channel measurement purposes (see Section 6.3.3.3), declares a Priority System Condition (see Section 6.2.3) using DCCH_1 as the only reselection candidate. The CELLTYPE for DCCH_1 defaults to PREFERRED until otherwise determined. In addition, the mobile station determines the MS_ACC_PWR, RSS_ACC_MIN, SS_SUFF and DELAY (see Section 6.3.3.4.2) for DCCH_1 prior to involving or while executing the Control Channel Reselection procedure (see Section 6.3.3).

In the Manual System Search procedure, the mobile station proceeds as follows. The mobile station first searches the current DCCH and neighboring DCCHs (including Private Operating Frequencies (POFs) if they exist) for all candidates that support one or more of the PSIDs, RSIDs, and preferred SID that the mobile station subscribes to. The mobile station then displays a PSID/RSID Alphanumeric Name of each PSID or RSID supported by the candidate control channels that match a PSID or RSID stored in the mobile station, and the Alphanumeric System ID of the preferred SID. The mobile station then marks as DCCH_1 the candidate control channel supporting the SID, PSID, or RSID matching the Alphanumeric System ID or PSID/RSID Alphanumeric Name selected by the user. If more than one candidate control channel supports the selected PSID, RSID, or SID, then the candidate with the highest signal strength is marked as DCCH_1. If no SID, PSID, or RSID is selected by the user, the procedure is simply terminated.

If DCCH_1 is not the current DCCH, then the mobile station performs the same steps as described above for the New PSID/RSID search procedure, i.e., adding DCCH_1 to the list of channels identified as requiring measurements, etc.

As was discussed above, when executing the New PSID/RSID Search procedure the mobile station collects one signal strength measurement on each frequency in the current frequency band. The current band can be one of the following: 800 MHz A or B, or 1900 MHz A, B, C, D, E, or F. Reference in this regard can be had to Tables A and B, which illustrate the channel numbers and frequency bands specified for 800 MHz and 1900 MHz operation, respectively, in IS-136.2, Sections 2.1.1.1.1 and 2.1.1.1.2, respectively.

TABLE A

800 MHz Operation
Channel Numbers and Frequencies

| System | Bandwidth (MHz) | Number of Channels | Boundary Channel Number | Transmitter Center Frequency (MHz) | |
|---|---|---|---|---|---|
| | | | | Mobile | Base |
| (Not used) | | 1 | (990) | (824.010) | (869.010) |

TABLE A-continued

800 MHz Operation
Channel Numbers and Frequencies

| System | Bandwidth (MHz) | Number of Channels | Boundary Channel Number | Transmitter Center Frequency (MHz) | |
|---|---|---|---|---|---|
| | | | | Mobile | Base |
| A" | 1 | 33 | 991 | 824.040 | 869.040 |
| | | | 1023 | 825.000 | 870.000 |
| A | 10 | 333 | 1 | 825.030 | 870.030 |
| | | | 333 | 834.990 | 879.990 |
| B | 10 | 333 | 334 | 835.020 | 880.020 |
| | | | 666 | 844.980 | 889.980 |
| A' | 1.5 | 50 | 667 | 845.010 | 890.010 |
| | | | 716 | 846.480 | 891.480 |
| B' | 2.5 | 83 | 717 | 846.510 | 891.510 |
| | | | 799 | 848.970 | 893.970 |

TABLE B

1900 MHz OPERATION
Channel Numbers and Frequencies for 1900 MHz Operation

| Band | Bandwidth (MHz) | Number of Channels | Boundary Channel Number | Transmitter Center Frequency (MHz) | |
|---|---|---|---|---|---|
| | | | | Mobile | Base |
| (Not used) | | 1 | 1 | 1850.010 | 1930.050 |
| A | 15 | 497 | 2 | 1850.040 | 1930.080 |
| | | | 498 | 1864.920 | 1944.960 |
| A,D (Note 1) | | 1 | 499 | 1864.950 | 1944.990 |
| A,D (Note 1) | | 1 | 500 | 1864.980 | 1945.020 |
| A,D (Note 1) | | 1 | 501 | 1865.010 | 1945.050 |
| D | 5 | 164 | 502 | 1865.040 | 1945.080 |
| | | | 665 | 1869.930 | 1949.970 |
| D,B (Note 1) | | 1 | 666 | 1869.960 | 1950.000 |
| D,B (Note 1) | | 1 | 667 | 1869.990 | 1950.030 |
| B | 15 | 498 | 668 | 1870.020 | 1950.060 |
| | | | 1165 | 1884.930 | 1964.970 |
| B,E (Note 1) | | 1 | 1166 | 1884.960 | 1965.000 |
| B,E (Note 1) | | 1 | 1167 | 1884.990 | 1965.030 |
| E | 5 | 165 | 1168 | 1885.020 | 1965.060 |
| | | | 1332 | 1889.940 | 1969.980 |
| E,F (Note 1) | | 1 | 1333 | 1889.970 | 1970.010 |
| E,F (Note 1) | | 1 | 1334 | 1890.000 | 1970.040 |
| F | 5 | 164 | 1335 | 1890.030 | 1970.070 |
| | | | 1498 | 1894.920 | 1974.960 |
| F,C (Note 1) | | 1 | 1499 | 1894.950 | 1974.990 |
| F,C (Note 1) | | 1 | 1500 | 1894.980 | 1975.020 |
| F,C (Note 1) | | 1 | 1501 | 1895.010 | 1975.050 |
| C | 15 | 497 | 1502 | 1895.040 | 1975.080 |
| | | | 1998 | 1909.920 | 1989.960 |
| Not Used | | 1 | 1999 | 1909.950 | 1989.990 |

Note 1: This channel does not entirely fall into a single band (A,B,C,D,E or F). A mobile station capable of operating in any band (A,B,C,D,E, or F or any combination of these) shall be able to operate also on the associated border channel(s).

However, a problem is created by this search procedure as currently specified, in that a desired Private or Residential system may be located in a different band than the mobile station's current band. If only the mobile station's current band is searched then the desired Private or Residential system will most likely not be located and acquired.

OBJECTS AND ADVANTAGES OF THE INVENTION

It is thus a first object and advantage of this invention to provide an improved method for executing a system search procedure with a mobile station.

It is a further object and advantage of this invention to provide a method, and a mobile station constructed to operate in accordance with the method, for increasing a probability that a mobile station will acquire and register with a desired non-public or autonomous system.

SUMMARY OF THE INVENTION

The foregoing and other problems are overcome and the objects of the invention are realized by methods and apparatus in accordance with embodiments of this invention.

A method of this invention is disclosed for operating a mobile station, the method including a first step (a) of storing information in the mobile station. The stored information includes an ordered list of frequency bands, where each frequency band includes at least one channel. For example, at least one frequency band is an 800 MHz frequency band and at least one other frequency band is a 1900 MHz frequency band. The stored information further includes an identity of a band wherein an acceptable control channel was last located. In the preferred embodiment of this invention the control channel is a digital control channel (DCCH).

A next step (b) is executed in response to a user invoking a search procedure to locate a new non-public system. The non-public system may be one of a Residential system or a Private system. This step accesses the memory to determine the identity of the band wherein an acceptable control channel was last located, and marks the band wherein the acceptable control channel was last located as a band to be searched.

A next step (c) collects signal strength measurements on channels in the band to be searched and executes a channel search procedure to locate a control channel of a desired non-public system within the band to be searched.

If a desired non-public system is not located in the band to be searched, a next step (d) accesses the memory to obtain a next band to be searched from the ordered list of frequency bands and marks the next band as the band to be searched.

The method repeats steps (c) and (d) until either the ordered list of frequency bands is exhausted or a desired non-public system is located, thereby enabling a non-public system to be located in a band other than the current band of the mobile station.

If the step of accessing the memory to determine the identity of the band wherein an acceptable control channel was last located is not successful, the method instead includes a step of accessing the memory to obtain a predetermined band (for example the first band) to be searched from the ordered list of frequency bands and then marking the predetermined band as the band to be searched.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
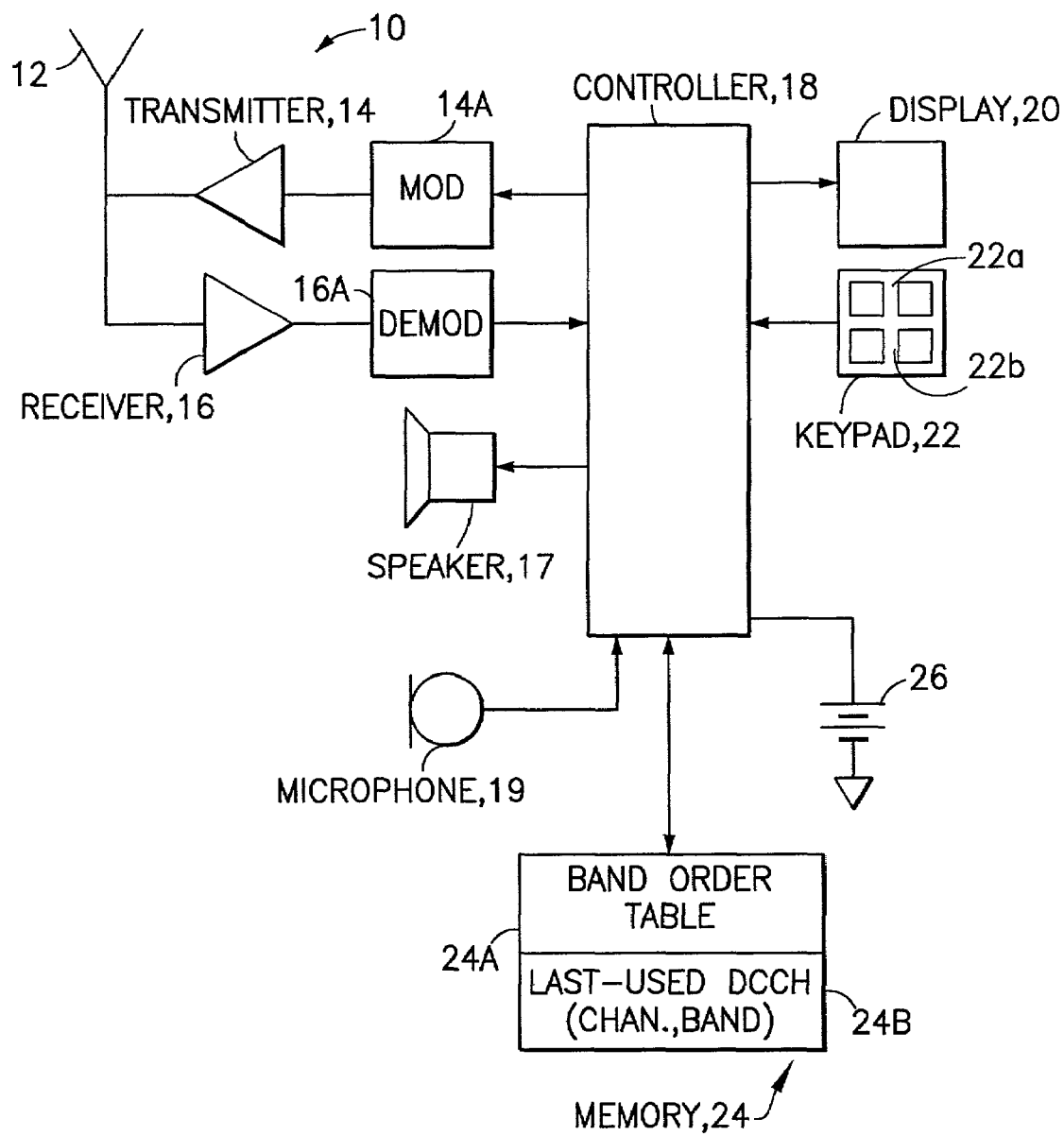
FIG. 1 is a block diagram of a mobile station that is constructed and operated in accordance with this invention.
Figure 2:
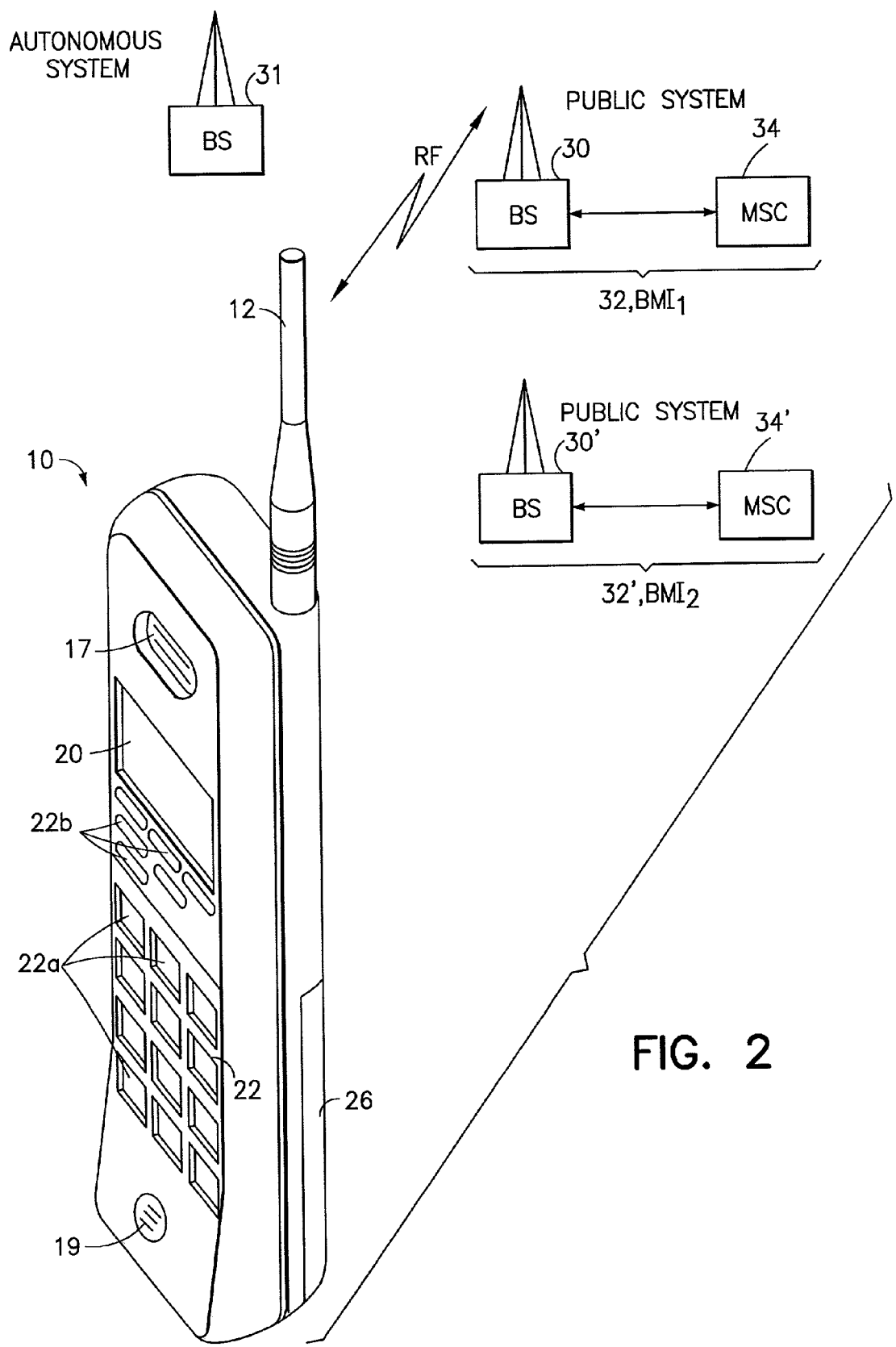
FIG. 2 is an elevational view of the mobile station shown in FIG. 1, and which further illustrates a plurality of cellular communication systems to which the mobile station can be bidirectionally coupled through wireless RF links.

Reference is first made to FIGS. 1 and 2 for illustrating a wireless user terminal or mobile station 10, such as but not limited to a cellular radiotelephone or a personal communicator, that is suitable for practicing this invention. The mobile station 10 can be a vehicle mounted or a handheld device. The mobile station 10 includes an antenna 12 for transmitting signals to and for receiving signals from a first base site or base station 30. The base station 30 is a part of a first cellular public system comprising a BMI ($BMI_1$) 32 that includes a mobile switching center (MSC) 34. The MSC 34 provides a connection to landline trunks when the mobile station 10 is involved in a call.

FIG. 2 also shows a second $BMI_2$ 32', having associated base station(s) 30' and MSC 32', which may or may not be present. By example, the $BMI_1$ 32 may be associated with a first digital public system (e.g., PCS1900 or GSM), and $BMI_2$ 32' may be associated with a second public system, such as analog system or another digital system. If the two or more public systems are not the same (e.g., both digital TDMA systems that use the same air interface), then the mobile station 10 is assumed to have at least dual mode capability (e.g., digital TDMA and AMPS) so that it can operate in the different types of public systems.

FIG. 2 further illustrates a base station 31 that is associated with an autonomous system, such as a Residential system having an associated RSID or a Private system having an associated PSID.

The mobile station 10 of FIG. 1 includes a transceiver comprised of a modulator (MOD) 14A, a tuneable transmitter 14, a tuneable receiver 16, a demodulator (DEMOD) 16A, and a controller 18 that provides signals to and receives signals from the transceiver. These signals include signalling information in accordance with the air interface standard of the applicable cellular system, and also user speech and/or user generated data. As was indicated above, the transmitter, receiver, modulator and demodulator may be at least dual-mode capable, and may operate with the frequencies, modulation type, access type, etc. of several of the various public and autonomous systems in the environment of the mobile station 10.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key. The mobile station 10 also includes a battery 26 for powering the various circuits that are required to operate the mobile station 10.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the BMI 32 prior to the display of the messages to the user.

The memory 24 also stores, in accordance with an aspect of this invention, a Band Order Table 24A. The Band Order Table 24A has a plurality of entries constituting a list of frequency bands (see FIGS. 4 and 5) and is ordered in the way the frequency bands are to be searched. The Band Order Table 24A can contain from one band to all bands (e.g., 800 MHz A and/or B, 1900 MHz A, B, C, D, E, and/or F). The memory 24 also stores Last-Used DCCH Information (channel/frequency band) 24B which is updated when the mobile station 10 camps on an acceptable or useable DCCH. The Band Order Table 24A and Last-Used DCCH Information 24B are preferably stored in a permanent (non-volatile) portion of the memory 24. The memory 24 also typically stores a list of channels to be measured, one or more SIDs, RSIDs, PSIDs, as described above, as well as other relevant parameters, such as a current SCANINTERVAL value and DELAY value, as received from a Control Channel Selection Parameters message.

The operating program stored in the memory 24 may include routines to present messages and message-related functions to the user on the display 20, typically as various menu items. These include a capability to enable the user to invoke a New PSID/RSID search procedure, as described above with respect to the discussion of Section 6.3.19 of IS-136.1 for the Non-Public Mode Search (NPS-DCCH) procedure. The memory 24 thus also includes routines for implementing the presently preferred search method described below in relation to FIG. 3.

Figure 3:
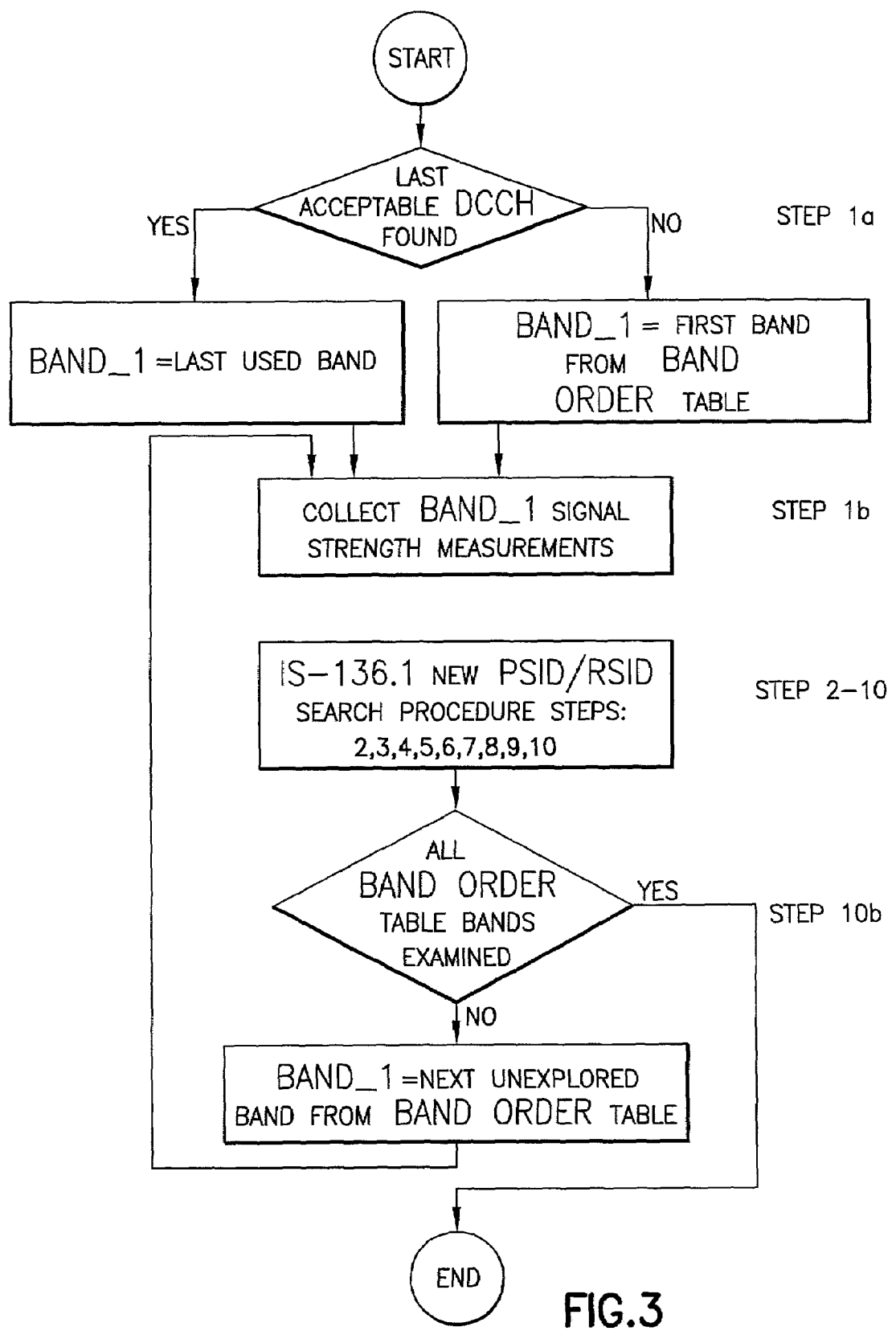
FIG. 3 is a logic flow diagram illustrating a presently preferred method for performing a multi-band search procedure with the mobile station illustrated in FIGS. 1 and 2.

Referring to FIG. 3, the above described New PSID/RSID Search and Manual System Search procedures are modified as follows.

When the user invokes the New PSID/RSID search procedure the mobile station 10 proceeds as follows. At Step 1a the controller 18 accesses the memory 24 and obtains the last-used DCCH information. The associated last-used frequency band is marked as Band_1. If the last-used DCCH information is not found in the memory 24, then the first frequency band found in the Band Order Table 24A is retrieved and marked as Band_1.

At Step 1b the mobile station 10 collects one signal strength measurement on each frequency in Band_1.

The following steps 2 through 10 may then be executed as currently specified in IS-136.1.

More particularly, at Step 2 the mobile station 10 makes a list of up to 24 channels having the strongest signals, and at Step 3 tunes the receiver 16 and the transmitter 14 to the strongest channel in the list. At Step 4 the mobile station 10 determines if this channel contains a DCCH. If it does, the mobile station 10 reads the Fast Associated Control Channel (FACCH) and determines if the DCCH is marked with a non-Public Network Type (Private and/or Residential) that is enabled in the mobile station. If this is the case, the DCCH is marked as DCCH_1. If the channel does not contain a DCCH, or if the DCCH is not marked with a non-Public Network Type that is enabled in the mobile station 10, control passes to Step 10 (described below).

At Step 5 a determination is made if a Test Registration is allowed on DCCH_1, according to the non-Public Registration Control information element. If Test Registrations are allowed, then the mobile station 10 formulates a Test Registration message for all PSIDs/RSIDs supported on DCCH_1, and then waits for a Test Registration Response on DCCH_1. If Test Registrations are not allowed, then control passes instead to Step 10.

At Step 6, upon receiving the Test Registration Response from DCCH_1, the mobile station 10 generates a list of PSIDs/RSIDs for which an "accepted" indication is provided, and marks an appropriate PSID/RSID in the "accepted" list as SYS_1. If an accepted indication is not indicated for any of the PSIDs/RSIDs supported on DCCH_1, control passes to Step 10.

At Step 7 the mobile station 10 displays the PSID/RSID Alphanumeric Name of the SYS_1 non-Public System. The user then has the option to accept or reject the displayed non-Public System.

If the user selects SYS_1, at Step 8 then the following sub-steps are executed.

8a: If SYS_1 is a PSID or RSID that is already stored in the mobile station 10, then update the stored PSID/RSID Alphanumeric Name.

8b: If SYS_1 is not a PSID or RSID that is already stored in the mobile station 10, then store the PSID or RSID and the PSID/RSID Alphanumeric Name along with the associated SID/SOC/MCC information.

8c: If the mobile station 10 currently registered on SYS_1, then terminate the procedure and remain in the DCCH Camping State.

8d: If DCCH_1 is the current DCCH, then the mobile station 10 declares a System Transition Condition (see IS-136.1, Section 6.2.3).

8e: If DCCH_1 is not the current DCCH, then the mobile station 10 adds DCCH_1 to the list of channels identified as requiring measurements (see IS-136.1, Section 6.3.3.1). After an appropriate delay required for channel measurement purposes (see IS-136.1, Section 6.3.3.3) the mobile station 10 declares a Priority System Condition (see IS-136.1, Section 6.2.3) using DCCH_1 as the only reselection candidate. The CELLTYPE for DCCH_1 is defaulted to PREFERRED until otherwise determined. In addition, the mobile station 10 determines the MS_ACC_PWR, RSS_ACC_MIN, SS_SUFF and DELAY (see IS-1361, Section 6.3.3.4.2) for DCCH_1 prior to invoking or while executing the Control Channel Reselection procedure (see IS-136.1, Section 6.3.3).

If the user does not select SYS_1 at Step 7, then instead at Step 9 the following sub-steps are executed.

9a: If the PSID/RSID marked as SYS_1 is the last PSID/RSID in the "accepted" list for DCCH_1, then control transfers to Step 10.

9b: If the PSID/RSID marked as SYS_1 is not the last PSID/RSID in the "accepted" list for DCCH_1, then another PSID/RSID in the "accepted" list for DCCH_1 is marked as SYS_1, and control passes back to Step 7.

At Step 10 a determination is made if the current channel is the last channel in the channel list (see Step 2). If it is, then control passes, in accordance with an aspect of this invention, to Step 10b. If the current channel is not the last channel in the channel list, then the mobile station 10 tunes to the next strongest channel in the channel list and control transfers back to Step 4.

Further in accordance with this invention, at Step 10b the mobile station 10 again accesses the Band Order Table 24A in the memory 24 and obtains the next frequency band in the Band Order Table 24A. If all bands have been searched (i.e., the Band Order Table 24A is exhausted), then the search procedure terminates. If all of the bands have not yet been searched, then the mobile station 10 obtains the next frequency band in the Band Order Table 24A, marks the next frequency band as Band_1 (i.e., the band to be searched), and control then transfers back to Step 1b to collect one signal strength measurement from each frequency in Band_1, and to then continue with Steps 2–10.

As an example, assume that the Band Order Table 24A contains bands A, B, C, D, E, and the Last Used DCCH 24B is in band B. In this case, the first band searched will be band B. If unsuccessful, then the next band to be searched will be band A, followed by band C if the search of band A is unsuccessful. That is, the bands are preferably stored in the Band Order Table 24A in order of priority, with the most significant or desirable band being listed first, followed by the next most desirable band, etc. However, the use of other band search orders are within the scope of the teaching of this invention.

It can be seen that the use of the teaching of this invention increases the probability that a user will be able to locate a desired non-public system when performing a New PSID/RSID Search procedure, as all frequency bands specified in the Band Order Table 24A (including one or more 1900 MHz bands) can be methodically searched.

The Band Order Table 24A can contain all possible frequency bands that the mobile station 10 is capable of operating with, or only a selected sub-set of these bands. The Band Order Table 24A can be stored permanently in ROM, or in a writable non-volatile memory such as EAROM or a battery-backed static RAM. In this latter case the mobile station 10 may be programmed so as to give the user (using the user interface or a connection to computer), a dealer, or a system operator an ability to alter the contents of the Band Order Table 24A. By example, a suitable signalling protocol can be defined for the air interface to enable a system operator, or some other entity located at a remote location, to remotely program the contents of the Band Order Table 24A to add or delete frequency bands, as well as to change the order of the frequency bands in the Band Order Table, thereby resulting in the bands being searched in a different order by the mobile station 10.

Although described above in the context of a specific air interface and specific frequency bands, it should be recognized that the teachings of this invention are not limited to only these presently preferred embodiments and further that a number of modifications to these teachings may occur to one skilled in the art. By example, the teaching of this invention is not limited for use only with systems constructed and operated in accordance with IS-136, or only with digital TDMA cellular systems, as CDMA and other wireless system types may benefit from the use of the teachings of this invention.

Thus, while the invention has been particularly shown and described with respect to preferred embodiments thereof, it will be understood by those skilled in the art that changes in form and details may be made therein without departing from the scope and spirit of the invention.

What is claimed is:

1. A mobile station, comprising:
a radio frequency (RF) transceiver;
a memory storing a list of entries, individual ones of said entries corresponding to a frequency band comprising at least one frequency channel; and
a controller, bidirectionally coupled to said memory and to said RF transceiver, and operating in response to a search procedure being invoked to locate a desired Non-Public wireless communication system, specifically one of a Residential wireless communication system or a Private wireless communication system, for accessing said memory to obtain a first entry of said list so as to determine a first frequency band to be searched for said desired one of said Residential wireless communication system or said Private wireless communication system, said controller being programmed to execute, using said RF transceiver, a search procedure in said first frequency band being searched in an attempt to locate a control channel of said desired one of said Residential wireless communication system or said Private wireless communication system and, if said control channel of said desired one of said Residential wireless communication system or said Private wireless communication system is not located within said first frequency band being searched, for accessing said memory to obtain a next entry in said list to determine a next frequency band to be searched for said desired one of said Residential wireless communication system or said Private wireless communication system, said controller continuing to search in this manner until either all of said entries of said list have been obtained from said memory or until said control channel of said desired one of said Residential wireless communication system or said Private wireless communication system is located.

2. A mobile station as in claim 1, wherein one said entries of said list comprises an identity of a frequency band wherein an acceptable control channel was last located.

3. A mobile station as in claim 1, wherein at least one frequency band is an 800 MHz frequency band.

4. A mobile station as in claim 1, wherein at least one frequency band is a 1900 MHz frequency band.

5. A mobile station as in claim 1, wherein said controller is responsive to an input for accessing said memory to modify said list of entries.

6. A mobile station as in claim 1, wherein said controller is responsive to an input for accessing said memory to add an entry to said list.

7. A mobile station as in claim 1, wherein said controller is responsive to an input for accessing said memory to delete an entry from said list.

8. A mobile station as in claim 1, wherein said controller is responsive to an input for accessing said memory to re-order entries in said list.

9. A mobile station as in claim 5, wherein said mobile station is further comprised of a user interface, and wherein said controller receives said input from said user interface.

10. A mobile station as in claim 5, wherein said controller receives said input through said RF transceiver.

11. A mobile station as in claim 1, wherein said controller is responsive to information received from a service provider through said RF transceiver for modifying said list of entries in said memory.

12. A mobile station as in claim 1, wherein information received through said RF transceiver is stored in said memory for re-ordering said list of entries.

13. A mobile station, comprising:
a radio frequency (RF) transceiver;
a memory storing information that is descriptive of all possible frequency bands that the mobile station is capable of operating with, each frequency band comprising at least one frequency channel; and
a controller, bidirectionally coupled to said memory and to said RF transceiver, and operating in response to a search procedure being invoked to locate a desired Non-Public wireless communication system, specifically one of a Residential wireless communication system or a Private wireless communication system, for accessing said memory to obtain a first frequency band to be searched for said desired one of said Residential wireless communication system or said Private wireless communication system, said controller being programmed to execute, using said RF transceiver, a search procedure in said first frequency band being searched in an attempt to locate a control channel of said desired one of said Residential wireless communication system or said Private wireless communication system and, if said control channel of said desired one of said Residential wireless communication system or said Private wireless communication system is not located within said first frequency band being searched, for accessing said memory to obtain another frequency band to be searched for said desired one of said Residential wireless communication system or said Private wireless communication system, said controller continuing to search in this manner until all of the frequency bands that the mobile station is capable of operating with have been searched or until said desired one of said Residential wireless communication system or said Private wireless communication system is located.

14. A mobile station as in claim 13, wherein said memory stores an identity of a frequency band wherein an acceptable control channel was last located.

15. A mobile station as in claim 13, wherein at least one frequency band is an 800 MHz frequency band.

16. A mobile station as in claim 13, wherein at least one frequency band is a 1900 MHz frequency band.

17. A mobile station as in claim 13, wherein said controller is responsive to an input for accessing said memory to modify said stored information.

18. A mobile station as in claim 13, wherein said controller is responsive to an input for accessing said memory to add a frequency band.

19. A mobile station as in claim 13, wherein said controller is responsive to an input for accessing said memory to delete a frequency band.

20. A mobile station as in claim 13, wherein said controller is responsive to an input for accessing said memory to re-order frequency bands appearing in a stored list of frequency bands.

21. A mobile station as in claim 17, wherein said mobile station is further comprised of a user interface, and wherein said controller receives said input from said user interface.

22. A mobile station as in claim 17, wherein said controller receives said input through said RF transceiver.

23. A mobile station as in claim 13, wherein said controller is responsive to information received from a service provider through said RF transceiver for modifying said information stored in said memory.

24. A mobile station as in claim 13, wherein information received through said RF transceiver is used to re-order a list of frequency bands stored in said memory.

* * * * *